United States Patent [19]
Etzold

[11] Patent Number: 5,855,992
[45] Date of Patent: Jan. 5, 1999

[54] WATERPROOF MULTI-LAYERED NON-WOVEN FABRIC OF REDUCED WEIGHT HAVING GOOD VAPOR PERMEABILITY AND METHOD FOR ITS PRODUCTION

[75] Inventor: Stefan Etzold, Langenhagen, Germany

[73] Assignee: Corovin GmbH, Peine, Germany

[21] Appl. No.: 924,815

[22] Filed: Sep. 5, 1997

[30] Foreign Application Priority Data

Oct. 17, 1996 [DE] Germany ......................... 196 42 958.7

[51] Int. Cl.$^6$ .................................................. B32B 27/14
[52] U.S. Cl. ........................ 428/198; 156/290; 156/212; 156/229; 428/903; 428/910; 442/340; 442/346; 442/382
[58] Field of Search ..................................... 428/198, 903, 428/910; 442/340, 346, 382; 156/290, 212, 229

[56] References Cited

U.S. PATENT DOCUMENTS

| | | | |
|---|---|---|---|
| 5,540,976 | 7/1996 | Shawyer et al. | 428/903 |
| 5,582,903 | 12/1996 | Levy et al. | 428/903 |
| 5,733,635 | 3/1998 | Terakawa et al. | 428/198 |
| 5,766,737 | 6/1998 | Willey et al. | 428/198 |

Primary Examiner—James J. Bell
Attorney, Agent, or Firm—Burns, Doane, Swecker & Mathis, L.L.P.

[57] ABSTRACT

A waterproof multi-layered non-woven fabric having good vapor permeability and method for its production are provided. At least one layer of coarse melt-spun filaments of a thermoplastic polymer is thermally bonded at intermittent points to at least one layer of fine melt-blown microfibers. The bonded layers next are subjected while heated to a force in at least one direction in the absence of tearing so as to accomplish the permanent elongation of coarse melt-spun filaments and the straightening of fine melt-blown microfibers in the direction of the force in the substantial absence of drawing. Fine melt-blown microfibers when straightened in this manner form a less thick and denser array within the resulting fabric. The resulting product is capable of deterring the passage of liquid water, exhibits substantial vapor permeability, and exhibits a reduced basis weight. According, the product is suitable for use as a filter to remove solid particles from a gas, as a diaper component, to form protective clothing for medical applications, in the production of a roofing material, etc. The resulting product provides significant economic advantages since a reduced quantity of thermoplastic polymer is required per unit area of product while retaining desired service characteristics.

22 Claims, 4 Drawing Sheets

WATERPROOF MULTI-LAYERED NON-WOVEN FABRIC OF REDUCED WEIGHT HAVING GOOD VAPOR PERMEABILITY AND METHOD FOR ITS PRODUCTION

BACKGROUND OF THE INVENTION

Strong waterproof multi-layered non-woven fabrics of substantial basis weight are known which include a spun filament layer and a melt-blown fiber layer. Such multi-layered fabrics are known to invariably possess a substantial basis weight since the melt-blown layer must be of a substantial thickness in order to make possible the desired waterproofness in the resulting fabric. Strength is contributed primarily by the spun filament layer.

Such multi-layered fabrics of the prior art have been used as leg-cuffs for diapers, in the production of protective clothing and covering materials for medical applications, and as roof insulation sheets, etc. Good vapor permeability is known to be desirable for such end uses.

It is an object of the present invention to provide an improved multi-layered non-woven fabric having good vapor permeability of reduced basis weight when compared to the prior art while retaining a waterproof character and which thereby requires a lesser quantity of the thermoplastic polymer starting material per unit of area as well as a method for its production.

Other objects of the invention, as well as its scope, nature, and utilization will be apparent to those skilled in the art from the following detailed description and appended claims.

SUMMARY OF THE INVENTION

It has been found that a multi-layered non-woven fabric of reduced weight having good vapor permeability and the ability to deter the passage of water consists essentially of (1) at least one layer of coarse melt-spun filaments of a thermoplastic polymer, and (2) at least one layer of fine melt-blown microfibers of a thermoplastic polymer, wherein layers (1) and (2) were thermally bonded together at intermittent points while in a surface-to-surface relationship and subsequently were subjected while heated to a force in at least one direction in the absence of tearing whereby coarse melt-spun filaments of layer (1) were permanently elongated in the direction of said force and fine melt-blown microfibers of layer (2) were straightened in the direction of said force in the substantial absence of drawing so as to form a denser array of said microfibers having a lesser thickness within the resulting fabric.

It has been found that a method for the production of a non-woven fabric of reduced weight having good vapor permeability and the ability to deter the passage of water comprises:

(a) thermally bonding in surface-to-surface contact at intermittent points (1) at least one layer of coarse melt-spun filaments of a thermoplastic polymer and (2) at least one layer of fine melt-blown microfibers of a thermoplastic polymer, (b) subjecting the layers following such bonding of step (a) while heated to a force in at least one direction in the absence of tearing to achieve the permanent elongation in the direction of the force of melt-spun filaments of layer (1) and the straightening of meltblown microfibers of layer (2) in the direction of the force in the substantial absence of drawing so as to form a denser array of said microfibers having a lesser thickness within the resulting fabric.

DESCRIPTION OF PREFERRED EMBODIMENTS

Figure 1:
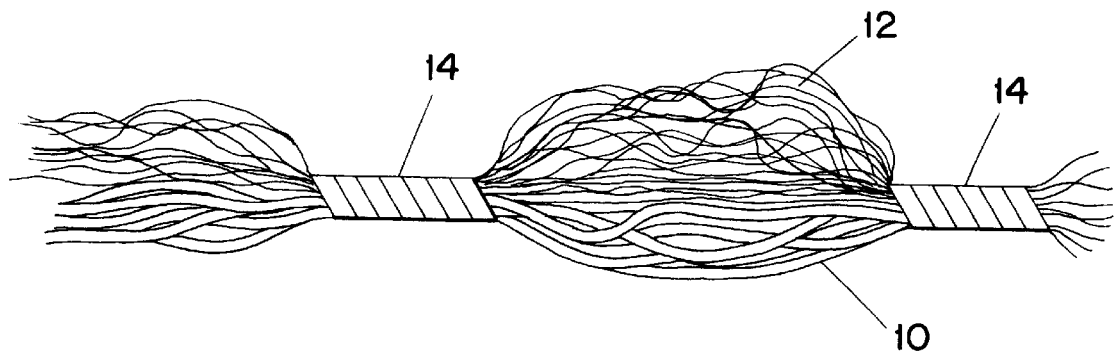
FIG. 1 is a schematic side view of a multi-layered non-woven fabric of the present invention at an intermediate stage in its formation following intermittent bonding and prior to the permanent elongation of coarse melt-spun filaments present in the bottom layer and the straightening of melt-blown microfibers of the top layer.

Any thermoplastic polymer that is capable of melt extrusion to form fibers may be utilized during to form the two essential fibrous components of the multi-layered non-woven fabric of the present invention. For instance, the thermoplastic polymer may be polypropylene, polyester (e.g., polyethylene terephthalate), polyethylene, etc. In a preferred embodiment the thermoplastic polymer is isotactic polypropylene. Various additives commonly used in conjunction with such thermoplastic polymers optionally may be present. For instance, additives that influence the rate of crystallization of the thermoplastic polymer may be included.

The thermoplastic polymer utilized to form the layer of coarse melt-spun filaments may be the same or different than the thermoplastic polymer utilized to form the layer of fine melt-blown microfibers.

In a preferred embodiment the thermoplastic polymer used to form the layer of coarse melt-spun filaments has a melt viscosity of MFI 16 to 35 as determined by DIN 1133, and the thermoplastic polymer used to form the layer of fine melt-blown microfibers has a melt viscosity of MFI 400 to 2500 as determined by DIN 1133. When conducting the melt viscosity determination, the quantity of molten polymer in grams at 230° C. is observed which will pass through a capillary having a diameter of 2.095±0.005 mm and a length of 8±0.25 mm over a period of 10 minutes. The melt viscosity can be modified through the addition of oxidizing agents that are capable of breaking polymeric chains. The greater melt viscosity of the thermoplastic polymer used to form the fine melt-blown microfibers causes such fibers to resist elongation or drawing, and to only straighten out when a force is applied as described hereafter. However, the lower melt viscosity of the coarse melt-spun filaments renders them well amenable to elongation or drawing when heated as described hereafter.

The respective layers of coarse melt-spun filaments of a thermoplastic polymer and fine melt-blown microfibers of a thermoplastic polymer that serve as starting materials may be formed by conventional techniques that are known in the art. The fibrous components of such layers preferably are provided in a substantially random manner within each layer. Also, such layers which serve as starting materials optionally may have been compacted prior to their alignment in surface-to-surface contact as described hereafter. In a preferred embodiment starting materials are selected wherein the coarse melt-spun filaments present in the first layer possess a diameter of approximately 20 to 30 μm and the fine melt-blown microfibers of the second layer possess a diameter of approximately 2 to 5 μm. Often the diameter of the course melt-spun filaments is approximately 10× that of the melt-blown microfibers. The coarse filaments in view of their thickness ensure the exhibition of adequate tensile strength as well as the possibility for substantial filament diameter reduction during the course of drawing (described hereafter). On the other hand, the melt-blown microfibers contribute little or no strength to the final product but do contribute significantly to the waterproof character of the product, since they have the potential to form a very dense layer having tiny intermediate spaces between adjoining fibers that make possible the desired vapor permeability.

When practicing the method of the present invention, at least one layer of the coarse melt-spun filaments of thermoplastic polymer is placed in surface-to-surface contact with at least one layer of the fine melt-blown microfibers. The respective layers next are thermally bonded together (i.e., thermo-bonded) at intermittent points. Such bonding can be termed heat-stamping or point-bonding and can be carried out using known techniques wherein heat and pressure are applied at discrete areas across the surface. In a preferred embodiment, the bonding sites are preferably less than about 0.5 mm$^2$ (e.g., about 0.2 to less than 0.5 mm$^2$) in size, and are provided at a frequency so that a significant proportion of the fibrous components are fixed by bond sites and/or through physical engagement at least at two different locations. In a preferred embodiment the intermittent bonding points are aligned so that adjacent points at least partially overlap crosswise to the direction of the drawing force (ie., the direction of production). The fibers commonly are heated up to their softening temperature at those areas where bonding is to occur and are compressed together to create permanent fusion and bonding that thereafter is retained in spite of the imposition of force during the elongation step described hereafter.

The thus bonded layers while heated next are subjected to a force in at least one direction in the absence of tearing. When such force is applied, the layers preferably are heated up to near their softening temperature. Such force achieves the permanent elongation of coarse melt-spun filaments and the straightening of fine melt-blown microfibers in the substantial absence of drawing. As will be apparent to those skilled in the art, the extent to which the melt-spun filaments can be drawn is influenced by the level of crystallization of the thermoplastic polymer, the filament spinning speed (e.g., relatively slow at 1,000 to 1,500 m/min or higher), the as-spun filament quench conditions, and the level of filament drawdown achieved during spinning. Some additional heat is generated within the melt-spun filaments as they are elongated. In a preferred embodiment, coarse melt-spun filaments are permanently elongated or drawn approximately 2 to 5× their original length. Concomitantly fine melt-blown microfibers are caused to straighten to form a denser array having a lesser thickness. This has been found to promote the waterproof character of the microfiber layer at the same time the overall basis weight of the resulting product is significantly reduced.

In a preferred embodiment the elongation of melt-spun filaments is conducted up to the maximum "straightening potential" of the fine melt-blown microfibers. The "straightening potential" is defined as the degree to which the fine melt-blown microfibers can be straightened with heating between bonding sites in at least one direction in the absence or tearing within the multi-layered non-woven product. When the "straightening potential" is exceeded, the waterproof nature of the resulting product is lost for all practical purposes. The elongation of melt-spun filaments always is terminated prior to a clear and dramatic increase in water permeability.

The advantageous results made possible through the practice of the present invention are considered to be surprising since one would reasonably have assumed that the elongation of the multi-layered non-woven fabric to have caused openings or pores between fibrous components to expand and to substantially destroy the waterproof nature of such fabric in a substantially linear manner. However, in the context of the present invention, empirical tests have demonstrated a non-linear relationship between the level of drawing and the retention of a waterproof character. Accordingly, when carrying out the present invention, it is found that the multi-layered non-woven fabric initially substantially retains during elongation or drawing the original waterproof character until a point is reached during the elongation or drawing that the waterproof character drastically decreases. Detailed consideration of this observation reveals that the voluminous nature of the commonly curled and randomly aligned melt-blown microfibers is capable of becoming straightened during the elongation step so that they are redeployed to a more efficient structure with respect to waterproofness. When practicing the present invention for all practical purposes only coarse melt-spun filaments are elongated and fine melt-blown microfibers are merely straightened primarily between bonding sites. The originally highly random and voluminous fine melt-blown filaments are pulled closer together in a more ordered manner during this procedure. Accordingly, the thickness of the layer of melt-blown microfibers decreases so as to form a denser and more compact array of the microfibers. This occurs at the same time the coarse melt-spun filaments decrease in diameter through elongation and substantially negates an apparent reduction in waterproof character that is caused by the reduction in thickness of the coarse melt-spun filaments and the simultaneous formation of openings between adjacent filaments as they are elongated. To at least some extent, the adjacent fine melt-blown microfibers also are believed to fill such openings when they become straightened.

The multi-layered non-woven fabric of the present invention in a preferred embodiment is sufficiently waterproof so as to prevent the passage of water from a column up to at least 150 mm in height and more preferably up to at least 200 mm in height while retaining the ability to breath and to permit the passage of water vapor. This provides a level of comfort to the user in applications such as clothing and diapers.

The multi-layered non-woven fabric of the present invention is suitable for use in diapers, protective clothing, covering materials for medical applications, a component in roofing materials, filters for the removal of solid particulate matter, etc. The requirements of the respective end users (e.g., requisite strength, and waterproofness combined with vapor permeability) are met while using a lesser quantity of polymeric starting material per unit area of fabric. This advantage accordingly makes possible reduced overall fabric production costs for a specified area of product.

The following example is presented as a specific illustration of the claimed invention. It should be understood, however, that the invention is not limited to the specific details set forth in the example.

FIG. 1 shows a schematic sectional view of a multilayered fabric that has been thermally bonded at intermittent points prior to elongation or stretching. The multi-layered non-woven fabric consists of a layer of coarse melt-spun filaments 10 and a layer of fine melt-blown microfibers 12. The filaments and microfibers were formed by the melt extrusion of a thermoplastic polymer. Layers 10 and 12 were joined while in surface-to-surface contact by heat-stamping at intermittent points 14 where the adjoining fibrous components were firmly fused together. The layer of coarse melt-spun filaments 10 was formed in a conventional manner with the filaments having been randomly collected on a surface, and the layer of fine melt-blown microfibers likewise was formed in a conventional manner wherein the discontinuous curled microfibers were randomly aligned. The two layers were joined through the use of heated calender rollers that were provided with stamping islands that produced thermo-bonding at the intermittent locations.

Layer 10 may first be formed, and layer 12 subsequently may be formed thereon followed by heat-stamping. Alternatively, each layer may be independently formed at different locations and supplied from a roller to create the multi-layered fabric that subsequently is heat-stamped at points 14.

The filaments of coarse melt-spun layer 10 possess a diameter that is approximately 10× that of the fine melt-blown microfibers of layer 12. When filaments of layer 10 are heated to near their softening temperature they can be readily elongated or drawn. On the other hand, during such stretching of filaments of layer 10, fine inherently discontinuous melt-blown microfibers are only straightened and are not drawn to any substantial degree. The layer of microfibers prior to the application of a force is very loose with the fibers extending in all directions including the direction perpendicular to the plane of the melt-blown deposit. During the drawing of the multi-layered non-woven fabric the microfibers become straightened largely parallel to the longitudinal plane. When this occurs, the thickness of the melt-blown layer 12 decreases and the microfibers become compressed as distances between such fine fibers are lessened.

Figure 2:
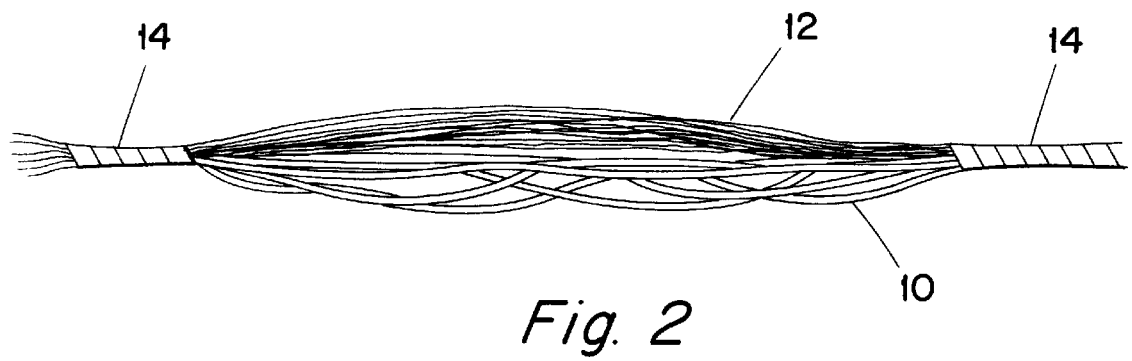
FIG. 2 is a schematic side view of a multi-layered non-woven fabric of the present invention following the permanent elongation of coarse melt-spun filaments present in the bottom layer and the straightening of the melt-blown microfibers of the top layer.

FIG. 2 shows in a schematic manner how the multi-layered fabric appears following the elongation of melt-spun filaments 10. Filaments 10 now exhibit a lesser diameter and the melt-blown microfibers 12 are now positioned more tightly together. Despite the lesser thickness of the product, the level of waterproofness remains largely unchanged. This result is accomplished because the melt-blown microfibers 12 are now pulled more closely together and the size of openings between microfibers is significantly reduced.

Figure 3:
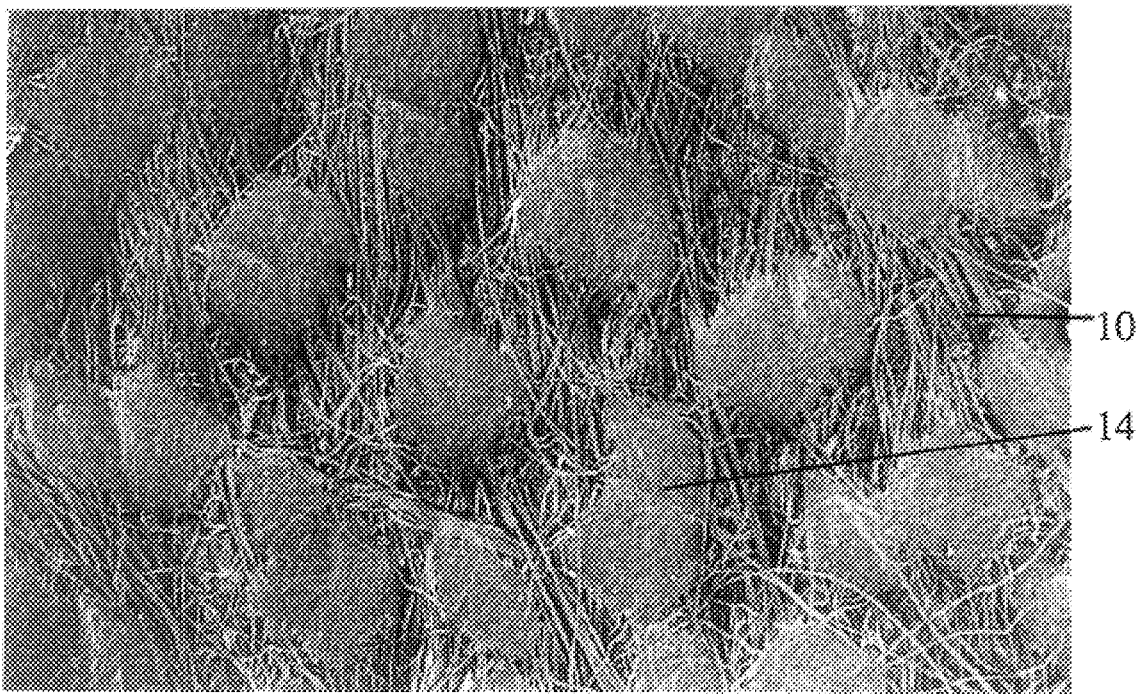
FIG. 3 is a top photographic view of a multi-layered non-woven fabric of the present invention at an intermediate stage in its formation following intermittent bonding and prior to the application of a force wherein a layer of coarse spun-bonded filaments is shown at a magnification of approximately 22×.
Figure 4:
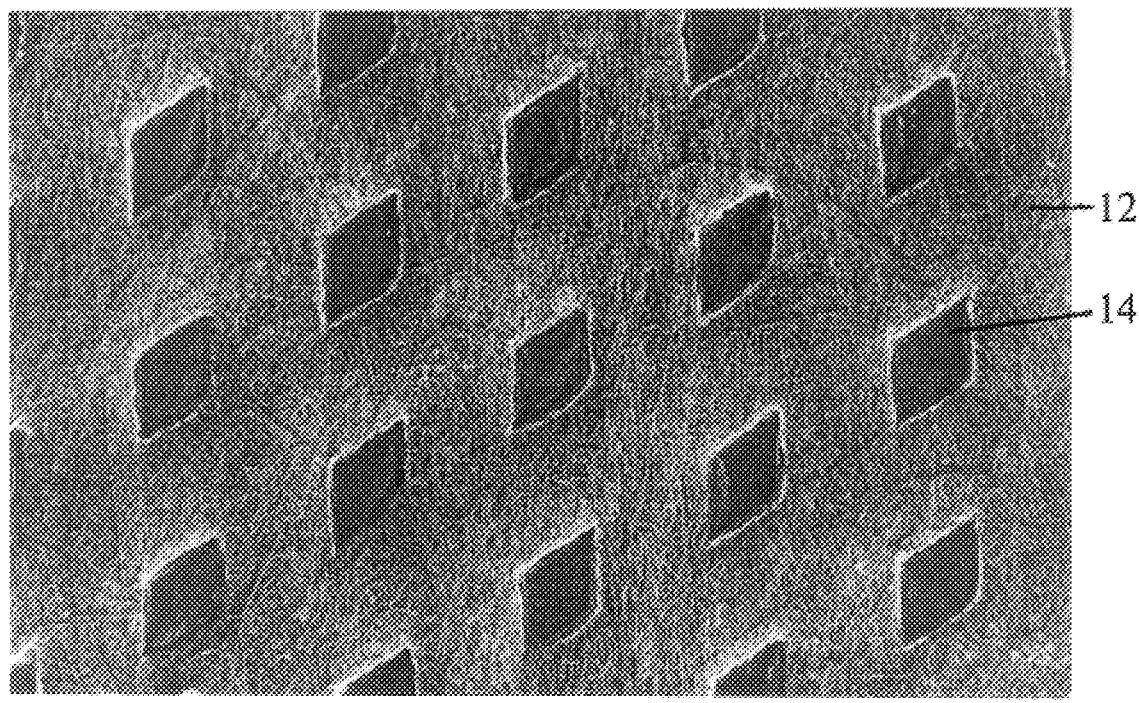
FIG. 4 is a bottom photographic view of a multi-layered non-woven fabric of the present invention at an intermediate stage in its formation following intermittent bonding and prior to the application of a force wherein a layer of fine melt-blown microfibers is shown at a magnification of approximately 22×.

FIGS. 3 and 4 show the respective surfaces of the multi-layered nonwoven fabric before elongation. FIG. 3 is a bottom view showing the layer of coarse melt-spun filaments, and FIG. 4 is a top view showing the layer of fine melt-blown microfibers. Both photographs were prepared while using the same scale. The coarser structure of the bottom layer is apparent in FIG. 3. Bonding points are shown at 14 of the coarse melt-spun layer 10 and the melt-blown layer 12. It further will be noted that adjacent stamp marks 14 at least partially overlap in the area crosswise to the direction of the drawing force that is to be applied.

Figure 5:
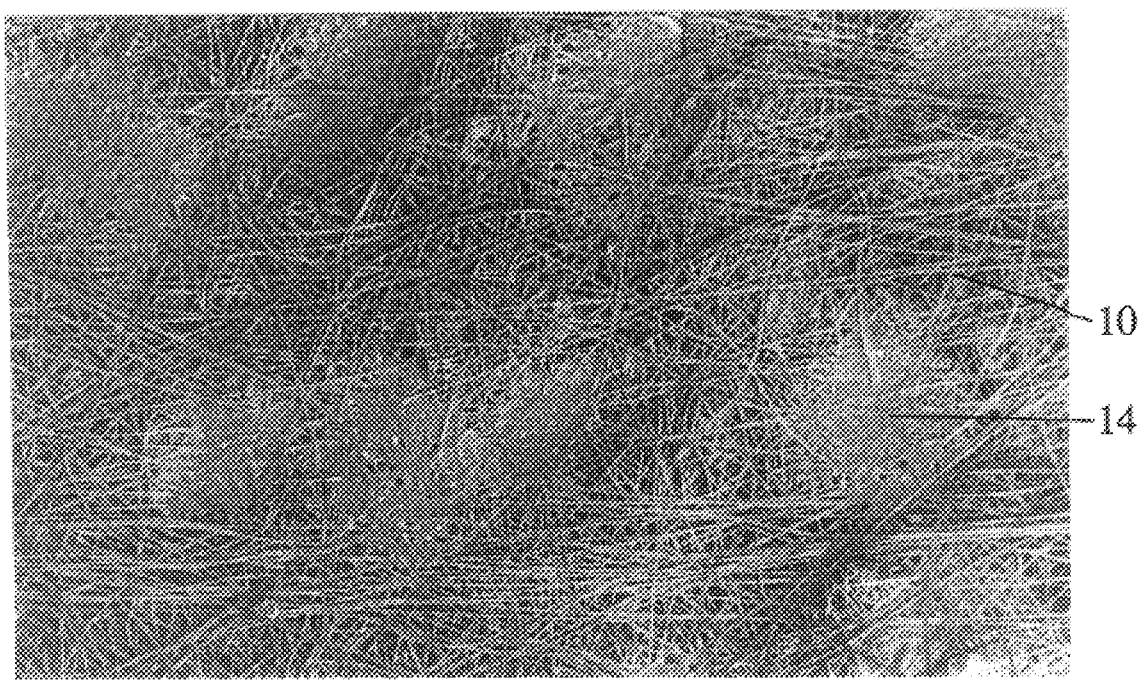
FIG. 5 is a top photographic view of a multi-layered non-woven fabric of the present invention wherein permanently elongated coarse spun-bonded filaments of the top layer are shown at a magnification of approximately 22×.
Figure 6:
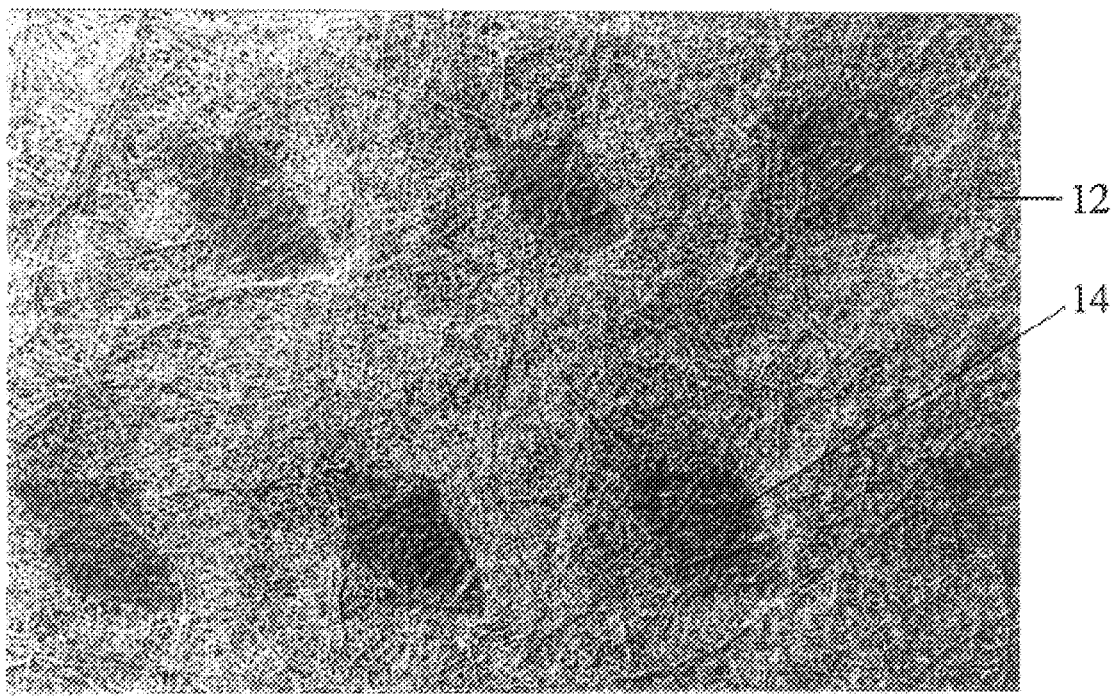
FIG. 6 is a bottom photographic view of a multi-layered non-woven fabric of the present invention wherein straightened melt-blown microfibers are shown at a magnification of approximately 22×.

FIGS. 5 and 6 show the respective surfaces of the multi-layered non-woven fabric following elongation. FIG. 5 is a bottom view showing the layer of coarse melt-spun filaments 10, and FIG. 6 is a top view showing the layer of fine melt-blown microfibers 12. The filaments 10 of the coarse melt-spun layer are slightly reduced in diameter and now are disposed more in the direction of the elongation. The fibers of the fine melt-blown layer 12 are now pulled closer together. As melt-blown fibers are straightened, other fibers are compressed that are in contact with them.

Figure 7:
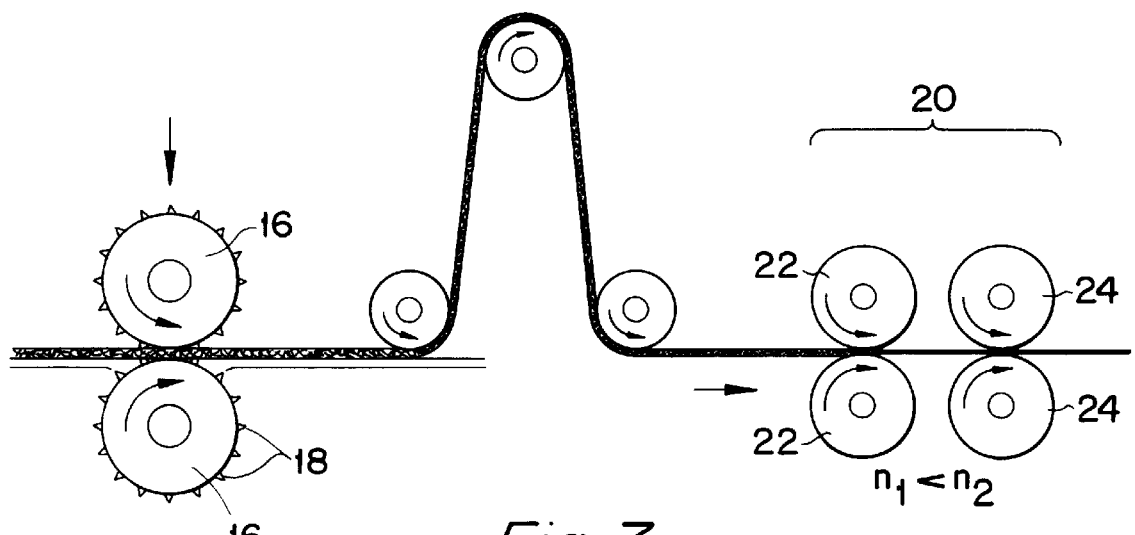
FIG. 7 shows a representative equipment arrangement for use when forming the multi-layered non-woven fabric of the present invention.
Figure 8:
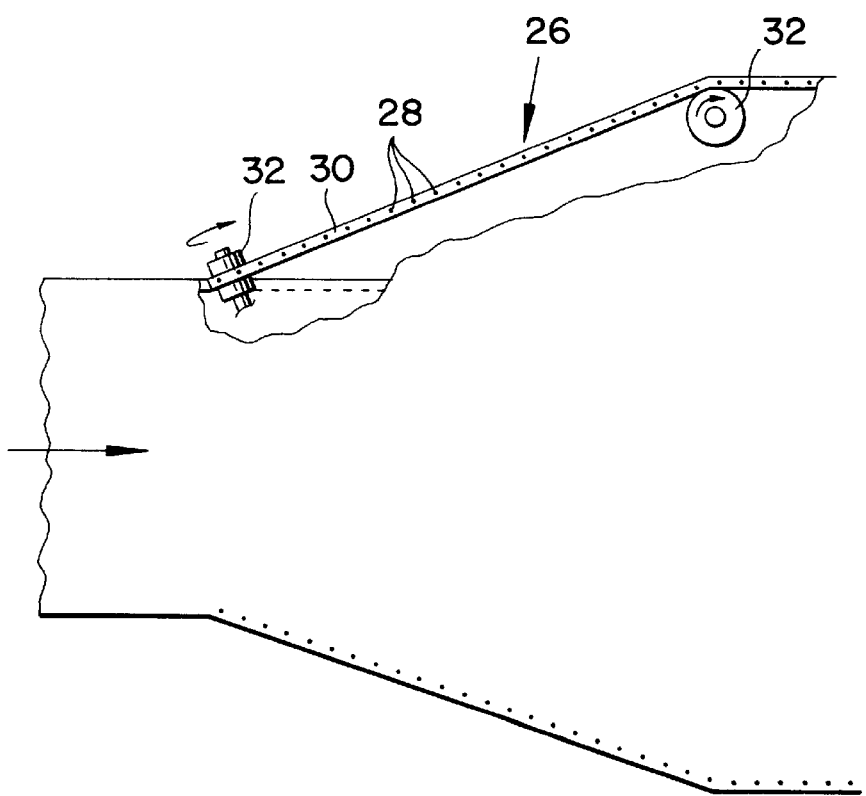
FIG. 8 shows a representative equipment arrangement for use when elongating transversely to the direction of production a multi-layered non-woven fabric of the present invention.

FIGS. 7 and 8 show devices that are suitable for the production of the multi-layered non-woven fabric of the present invention. After the layers of coarse melt-spun filaments and fine melt-blown microfibers are separately produced, they are brought together in surface-to-surface contact and are passed between a pair of heated rotating calender rollers 16. The calender rollers 16 possess raised stamp islands 18 upon their surfaces and cause fusion of the respective layers at points of contact having areas of approximately 0.25 mm$^2$. Following passage around intermediate rollers, the multi-layered non-woven fabric next is conveyed to stretching device 20 consisting of two pairs of smooth heated rollers 22 and 24. Rollers 22 and 24 heat the multi-layered fabric to a temperature just below the softening temperature of the fibrous components. Rollers 24 are rotated at a higher speed than rollers 22 which accomplishes the permanent elongation of coarse melt-spun filaments while preserving the fibrous character of each of the fibrous components.

In FIG. 8 a stretching frame 26 is shown that is capable of elongating the multi-layered non-woven fabric in a crosswise direction. The heated stretching frame 26 comprises a pair of continuous belts 30 that are bordered with catches 28 which engage the multi-layered fabric along the edges. The belts 30 pass over guide rollers 32 and define the path of the fabric as it is directed diagonally outwardly away from the center line. The fabric accordingly is stretched as its outer edges conform to the path defined by the moving continuous belts 30. When two-dimensional elongation is desired, the devices of FIGS. 7 and 8 are employed in combination.

The advantageous properties of the multi-layered non-woven fabric of the present invention can be demonstrated through observation before and after elongation. For instance, in the absence of elongation when the layer of coarse melt-spun filaments has a basis weight of 30 g/m$^2$ and the fine melt-blown microfiber layer has a basis weight of 15 g/m$^2$, the filament layer was found to contribute 80 mm of waterproofness and the melt-blown layer was found to contribute 200 mm of waterproofness for a total of 280 mm. However, the product of the present invention can reduce the basis weight to one-third or less and only sacrifice a small proportion of the level of waterproofness. More specifically, after 3× elongation, the layer of coarse melt-spun filaments had a basis weight of 10 g/m² and the microfiber layer has a basis weight of 5 g/m². After such elongation the filament layer was found to contribute 40 mm of waterproofness and the melt-blown layer was still found to contribute 200 mm of waterproofness in spite of the drastic reduction in its thickness. Accordingly, the product of the present invention prevented the passage of water from a column up to 240 mm in height compared to a height of 280 mm prior to elongation, while requiring only one-third the quantity of starting material.

The precise level of waterproofness achieved in the product of the present invention can be modified through an adjustment of the thickness of the various layers and through the degree of drawing that is imparted.

Although the invention has been described with preferred embodiments, it is to be understood that variations and modifications may be resorted to as will be apparent to those skilled in the art. Such variations and modifications are to be considered within the purview and scope of the claims appended hereto.

I claim:

1. A multi-layered non-woven fabric of reduced weight having good vapor permeability and the ability to deter the passage of water consisting essentially of (1) at least one layer of coarse melt-spun filaments of a thermoplastic polymer, and (2) at least one layer of fine melt-blown microfibers of a thermoplastic polymer, wherein said layers (1) and (2) were thermally bonded together at intermittent points while in a surface-to-surface relationship and subsequently were subjected while heated to a force in at least one direction in the absence of tearing whereby coarse melt-spun filaments of layer (1) were permanently elongated in the direction of said force and fine melt-blown microfibers of layer (2) were straightened in the direction of said force in the substantial absence of drawing so as to form a denser array of said microfibers having a lesser thickness within the resulting fabric.

2. A multi-layered non-woven fabric according to claim 1 wherein said thermoplastic polymers of layers (1) and (2) are independently selected from the group consisting of polypropylene, polyester, and polyethylene.

3. A multi-layered non-woven fabric according to claim 1 wherein said thermoplastic polymer of layers (1) and (2) is isotactic polypropylene.

4. A multi-layered non-woven fabric according to claim 1 wherein said thermoplastic polymer of layer (1) has a melt viscosity of MFI 16 to 35 as determined by DIN 1133, and said thermoplastic polymer of layer (2) has a melt viscosity of MFI 400 to 2500 as determined by DIN 1133.

5. A multi-layered non-woven fabric according to claim 1 wherein said coarse melt-spun filaments of layer (1) exhibited a diameter of 20 to 30 µm prior to said elongation and said fine melt-blown microfibers of layer (2) exhibited a diameter of 2 to 5 µm prior to said elongation.

6. A multi-layered non-woven fabric according to claim 1 wherein the intermittent points at which layers (1) and (2) were bonded together were aligned so that adjacent points at least partially overlap in the area crosswise to the direction of said force.

7. A multi-layered non-woven fabric according to claim 1 wherein said heating was carried out near the softening point of said coarse melt-spun filaments during the imposition of said force that achieved said permanent elongation.

8. A multi-layered non-woven fabric according to claim 1 wherein during said drawing of coarse melt-spun filaments of layer (1) melt-blown microfibers of layer (2) achieved the maximum straightening possible in the absence of tearing.

9. A multi-layered non-woven fabric according to claim 1 wherein during said permanent elongation of coarse melt-spun filaments of layer (1) a drawing of 2 to 5× the original length took place.

10. A multi-layered non-woven fabric according to claim 1 wherein said layers (1) and (2) following said intermittent thermal bonding were subjected to a drawing force in two different directions.

11. A multi-layered non-woven fabric according to claim 1 which prevents the passage of water from a column up to at least 150 mm in height.

12. A multi-layered non-woven fabric according to claim 1 which prevents the passage of water from a column up to at least 200 mm in height and said layer (1) has a basis weight of approximately 10 g/m² and said layer (2) has a basis weight of approximately 5 g/m².

13. A method for the production of a non-woven fabric of reduced weight having good vapor permeability and the ability to deter the passage of water comprising:
   (a) thermally bonding in surface-to-surface contact at intermittent points (1) at least one layer of coarse melt-spun filaments of a thermoplastic polymer and (2) at least one layer of fine melt-blown microfibers of a thermoplastic polymer,
   (b) subjecting the layers following said bonding of step (a) while heated to a force in at least one direction in the absence of tearing to achieve the permanent elongation in the direction of the force of the melt-spun filaments of layer (1) and the straightening of melt-blown microfibers of layer (2) in the direction of said force in the substantial absence of drawing so as to form a denser array of said microfibers having a lesser thickness within the resulting fabric.

14. A method for the production of a multi-layered non-woven fabric according to claim 13 wherein said thermoplastic polymers of layers (1) and (2) are independently selected from the group consisting of polypropylene, polyester, and polyethylene.

15. A method for the production of a multi-layered non-woven fabric according to claim 13 wherein said thermoplastic polymer of layers (1) and (2) is isotactic polypropylene.

16. A method for the production of a multi-layered non-woven fabric according to claim 13 wherein said thermoplastic polymer of layer (1) has a melt viscosity of MFI 16 to 35 as determined by DIN 1133, and said thermoplastic polymer of layer (2) has a melt viscosity of MFI 400 to 2500 as determined by DIN 1133.

17. A method for the production of a multi-layered non-woven fabric according to claim 13 wherein said coarse melt-spun filaments of layer (1) exhibit a diameter of 20 to 30 µm prior to said elongation and said fine melt-blown microfibers of layer (2) exhibit a diameter of 2 to 5 µm prior to said elongation.

18. A process for the production of a multi-layered non-woven fabric according to claim 13 wherein the intermittent points at which layers (1) and (2) are bonded together in step (a) are aligned so that adjacent points at least partially overlap in the area crosswise to the direction of said force.

19. A process for the production of a multi-layered non-woven fabric according to claim 13 wherein said heating during step (b) is carried out near the softening point of said coarse melt-spun filaments.

20. A process for the production of a multi-layered non-woven fabric according to claim 13 wherein during step (b) said drawing of coarse melt-spun filaments of layer (1) melt-blown microfibers of layer (2) achieve the maximum straightening possible in the absence of tearing.

21. A process for the production of a multi-layered non-woven fabric according to claim 13 wherein during said permanent elongation of coarse melt-spun filaments of layer (1) of step (b) a drawing of 2 to 5× the original length takes place.

22. A process for the production of a multi-layered non-woven fabric according to claim 13 wherein said layers (1) and (2) in step (b) are subjected to a drawing force in two different directions.

* * * * *